(12) United States Patent
Blom et al.

(10) Patent No.: US 7,681,050 B2
(45) Date of Patent: Mar. 16, 2010

(54) SECURE AND REPLAY PROTECTED MEMORY STORAGE

(75) Inventors: Rolf Blom, Järfälla (SE); Christian Gehrmann, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1139 days.

(21) Appl. No.: 11/275,015

(22) Filed: Dec. 1, 2005

(65) Prior Publication Data
US 2007/0130470 A1    Jun. 7, 2007

(51) Int. Cl.
G06F 12/16    (2006.01)
(52) U.S. Cl. .......................... 713/194; 713/161
(58) Field of Classification Search ............... 713/181, 713/191
See application file for complete search history.

(56) References Cited

U.S. PATENT DOCUMENTS

| | | | |
|---|---|---|---|
| 5,757,919 | A | 5/1998 | Herbert et al. |
| 6,832,317 | B1 | 12/2004 | Strongin |
| 6,836,853 | B1 | 12/2004 | Dover |
| 2002/0616742 | | 10/2002 | Heiden |
| 2003/0007437 | A1 | 1/2003 | Staring |
| 2004/0003244 | A1 | 1/2004 | England |
| 2004/0126093 | A1 | 7/2004 | Platt |
| 2005/0123142 | A1 | 6/2005 | Freeman |
| 2005/0228993 | A1 * | 10/2005 | Silvester et al. ............. 713/168 |
| 2005/0289646 | A1 * | 12/2005 | Zimmer et al. ................. 726/9 |
| 2006/0020941 | A1 * | 1/2006 | Inamura et al. ............. 718/100 |
| 2006/0198515 | A1 * | 9/2006 | Forehand et al. .............. 380/28 |
| 2006/0271796 | A1 * | 11/2006 | Kaimal et al. ............... 713/194 |
| 2007/0016766 | A1 * | 1/2007 | Richmond et al. .......... 713/100 |
| 2007/0073416 | A1 * | 3/2007 | Grawrock ...................... 700/1 |

FOREIGN PATENT DOCUMENTS

| | | |
|---|---|---|
| EP | 1063811 A1 | 12/2000 |
| EP | 1204910 | 5/2003 |
| GB | 2351819 A | 1/2001 |
| WO | WO 00/62290 | 10/2000 |
| WO | WO 01/33317 A1 | 5/2001 |
| WO | WO 03/081549 A2 | 3/2003 |
| WO | WO 2005/008385 A2 | 7/2004 |

OTHER PUBLICATIONS

Anciaux, Nicolas; Data Confidentiality: to Which Extent Cryptography and Secured Hardware Can Help; Nom de la revue. vol. X-n° pp. 1 a X.
Lamport, Leslie., Password Authentication with Insecure Communication, Communications of the ACM, Nov. 1981, vol. 24, No. 11, pp. 770-772; BNSDOCID XP_577349A.
Schneire, Bruce; Applied Cryptography, Second Edition, John Wiley & Sons, New York, Aug. 11, 1999, pp. 28-29, 169-175, 189-197, 357-363. BNSDOCID XP_002985121.

* cited by examiner

*Primary Examiner*—Matthew B Smithers
(74) *Attorney, Agent, or Firm*—Michael G. Cameron

(57) ABSTRACT

A device (e.g., mobile device) and method are described herein that can protect data stored in a rewritable openly accessible memory from replay attacks by using an integrity key and an encryption key to en/decrypt the data, integrity protect the data via a MAC calculation, and verify the data.

17 Claims, 3 Drawing Sheets

SECURE AND REPLAY PROTECTED MEMORY STORAGE

TECHNICAL FIELD

The present invention relates to a device (e.g., mobile device) and a method for confidentiality and integrity protecting data stored in a rewritable openly accessible memory.

BACKGROUND

A mobile device often has a processing system with a trusted platform which uses protected software and protected hardware to help guarantee the confidentiality and integrity of stored data. Today there are several different techniques which can be used to confidentiality and integrity protect data in a processor system. Some of these existing techniques are as follows:

Tamper-proof memory and processing. Such memory may be an integral part of a processor chip and the read write operations to the memory are limited in such a way that they can only be performed via the processor system. The memory could also be an external memory which is protected from physical access by some tamper resistance technique.

One-time write-only memory. Such memory is usually used to store data which does not need to be secret but which should be impossible to change.

Processing systems in which a secret key is stored in integrity and confidentiality protected memory. This secret key is then used to encrypt and integrity protect data which is stored in rewritable openly accessible memory.

The problem with techniques along the ideas in the third bullet above is that it may be possible for an attacker to replace current memory data with data that was recorded at an earlier time. This type of attack is well known from the early times of telephone cards and has been seen more recently with Subscriber Identity Module (SIM) cards which store the user's current amount in their prepaid account. Basically, the attacker records the memory data just when a SIM card has been loaded with a new value denoting a given amount of pre-paid service. Then, after the SIM card has been used an attacker would rewrite the current recorded memory data to be the earlier recorded memory data such that the SIM card now appears to have an unused value.

Another example is digital right management (DRM) protected data which often has limitations on the number of times it is allowed to be viewed/played by a user. In this case, a DRM counter must be stored and integrity protected. Similar to the SIM card case, the DRM counter is sensitive to replay attacks in which an attacker replaces a smaller current DRM counter value with a larger DRM counter value that was recorded at an earlier time. Accordingly, there is a need to prevent a replay attack by a person who would like to change information by replacing current memory data with previously recorded valid memory data. This problem and other problems are solved by the present invention.

SUMMARY

The present invention is related to a device (e.g., mobile device) and method that can protect data which is stored in a rewritable openly accessible memory from replay attacks by using an integrity key and an encryption key to en/decrypt the data, integrity protect the data via a MAC calculation, and verify the data. In one embodiment, the method includes the steps of: (a) verifying the integrity of old data which is currently stored in the rewritable openly accessible memory by using one or more current keys (e.g., integrity key MIK_n and if desired an encryption key MCK_n); (b) calculating one or more new keys (MIK_n+1 and if desired MCK_n+1) where each new key (MIK_n+1 and if desired MCK_n+1) is calculated by using a pseudo random function (PRF), a secret key (PK) and a counter value plus one (n+1)); (c) protecting the verified old data and new data if any using the one or more new keys (MIK_n+1 and if desired MCK_n+1): (d) storing the protected old data and the protected new data if any in the rewritable openly accessible memory; (e) incrementing a monotone register to have a counter value (n+1); and (f) erasing the old data that was verified in step (a) from the rewritable openly accessible memory.

BRIEF DESCRIPTION OF THE DRAWINGS

A more complete understanding of the present invention may be had by reference to the following detailed description when taken in conjunction with the accompanying drawings wherein.

DETAILED DESCRIPTION

To counter attacks in which current memory data is replaced by old memory data, the old memory data has to be recognized as being obsolete by the processing system. If the old memory data were integrity protected and possibly enciphered protected using key(s) other than the current protection key(s), then the processing system would be able to detect the rewrite. Thus, the basic idea of the present solution involves the following:

1. A mechanism and control for generating a sequence of data that can be used for keying purposes. How the data is used depends on the specific security solution that is chosen. In the security solution discussed herein the keying data is divided into to parts, one part is used to generate keys for confidentiality/encryption protection and the other part is used to generate keys for integrity protection. This mechanism and control needs to generate the sequence of data in a manner such that old keys cannot be regenerated.

2. A mechanism to use the integrity key and the encryption key (optional) to protect data which is stored in a rewritable openly accessible memory.

In one embodiment, the mechanism for generating the integrity key and the encryption key is implemented in a tamper-proof module. This is to guarantee that all of the variables used to generate the keys are protected. The keys are generated using a Pseudo Random Function (PRF), a secret key PK (specific to the device and stored in the tamper-proof module), and a monotonic sequence, e.g. a counter value. A trusted process controls the stepping of the monotonic sequence.

The use of the keys, for en/decryption of protected data and the integrity protection (via a MAC calculation and verification) of protected data is performed in a tamper-proof module by trusted software and trusted hardware. Preferably these operations are done in the same tamper-proof module which is used to generate the keys. Otherwise, the keys should be confidentiality protected when they are transferred between the tamper-proof modules. A detailed description about a device 100 which can implement the present solution and a step-by-step description about one way the device 100 can protect data is provided next with respect to FIG. 1.

Figure 1:
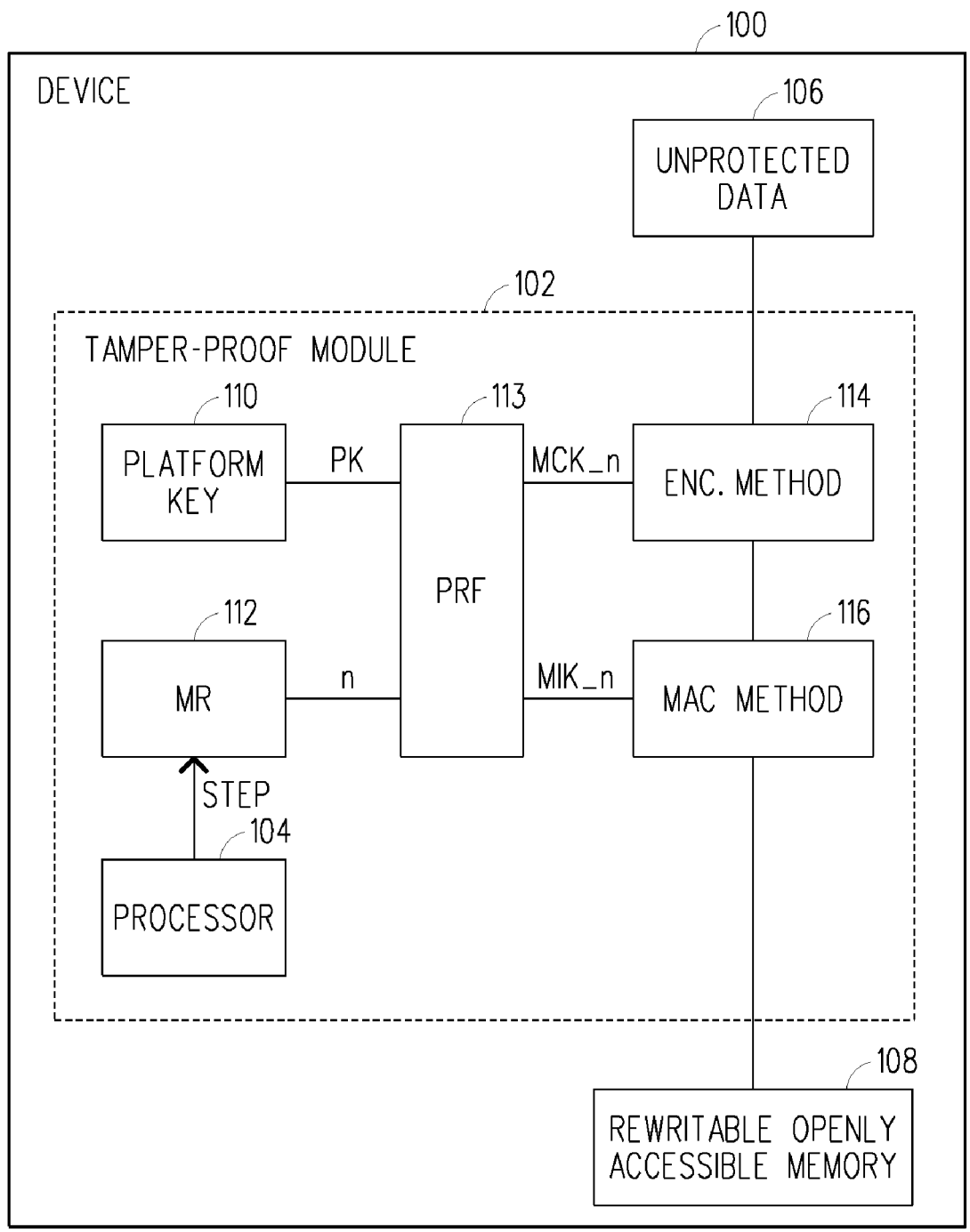
FIG. 1 is a block diagram of a device (e.g., mobile device) which has a tamper-proof module that confidentiality and integrity protects data stored in a rewritable openly accessible memory in accordance with the present invention.

Referring to FIG. 1, there is a block diagram of a device 100 (e.g., mobile device 100) which has a tamper-proof module 102 and a processor 104 that are used to confidentiality and integrity protect data 106 that is to be stored in a rewritable openly accessible memory 108. As shown, the tamper-proof module 102 (trusted module 102) has a platform key store 110 which holds a platform key (PK), and a monotone register (MR) 112 which holds a counter value (n). The PK and counter value (n) are used to calculate a memory confidentiality key (MCK) and a memory integrity key (MIK) with the help of a common PRF 113 (or two specific PRFs). This calculation is as follows:

$$MCK\_n = PRFc(PK, n)$$

$$MIK\_n = PRFi(PK, n)$$

After calculating MCK and MIK, the tamper-proof module 102 implements a suitable encryption method 114 which uses the MCK (encryption key) to confidentiality protect the data 106. In addition, the tamper-proof module 102 implements a suitable message authentication code (MAC) method 116 which uses the MIK (integrity key) to integrity protect the previously encrypted data which is then stored in the rewritable openly accessible memory 108. An exemplary, MAC method is HMAC (Keyed-Hashing for Message Authentication) with SHA-1 where the HMAC defines how the key is introduced in the calculation. Alternatively, one could use just the MAC method 116 and MIK to integrity protect the unprotected data 106 and not encrypt the data which is to be stored in the rewritable openly accessible memory 108. In yet another alternative, one could use the encryption method 114 and MCK (encryption key) to confidentiality protect data that has already been integrity protected. The examples described herein are based on the scenario where the data is encrypted protected and then integrity protected before it is stored in the rewritable openly accessible memory 108.

A step-by-step description is provided next to illustrate one way t hat the present solution can be used to prevent replay attacks on a DRM_counter. The step-by-step description follows:

1. The tamper-proof module 102 receives unprotected data 106 which in this example is a DRM counter (value x) that needs to be protected and stored in the rewritable openly accessible memory 108. As will be appreciated, the information that needs protection is usually not the DRM content itself but the DRM counter which indicates the number of allowed readings/playings of the DRM content.

2. Upon some trigger event (e.g., start-up, controlled power down, update of critical security parameters), the old data currently stored in the rewritable openly accessible memory 108 is verified to make sure it was not the subject of a replay attack. To verify the old data, the tamper-proof module 102 (using the processor 104 and read-only-memory (ROM) code) checks the MAC value (or values) of the protected old data using keys MIK_n and MCK_n which are based on the current MR counter value n. At this point, assume the integrity of the old data is verified.

3. The tamper-proof module 102 calculates new keys MIK_n+1 and MCK_n+1 by using the current counter value n+1. It should be noted that the MR 112 is not incremented at this point.

4. The tamper-proof module 102 uses the new keys MIK_n+1 and MCK_n+1 to encrypt/integrity protect the DRM_counter(value x). In addition, the tamper-proof module 102 re-encrypts/integrity protects the verified old data (see step 2) using MIK_n+1 and MCK_n+1.

5. The tamper-proof module 102 stores the old data which was protected by keys MIK_n+1 and MCK_n+1 in the rewritable openly accessible memory 108. In addition, the protected DRM_counter(value x) is stored as DRM_counter_n+1 in the rewritable openly accessible memory 108.

6. The tamper-proof module 102 increments n to n+1 in the MR 112. Once, n has been incremented then there is no way to retrieve and use keys with smaller values other than the current n.

7. The tamper-proof module 102 erases the old version of the data that was verified in step 2 by using keys MIK_n and MCK_n. As can be seen, the present solution only allows the "current keys" (e.g., MIK_n and MCK_n) and the "next keys" (e.g., MIK_n+1 and MCK_n+1) to be referenced when verifying/protecting the data. As such, an important aspect of the present solution is that operations are performed with the "current keys" and the "next keys" and that all of the verification/confidentiality processing is completed before incrementing MR 112 and erasing the old version of the protected data.

8. An attacker records the encrypted/integrity protected DRM_counter_n+1.

9. The DRM_counter is decremented to value x−1 because the user accessed the DRM content.

10. Upon some trigger event (e.g., start-up, controlled power down, update of critical security parameters), the old data that was stored during step 5 in the rewritable openly accessible memory 108 is verified to make sure it was not the subject of a replay attack. To verify the old data, the tamper-proof module 102 (using the processor 104 and read-only-memory (ROM) code) checks the MAC value (or values) of the protected old data using keys MIK_n+1 and MCK_n+1 which are based on the current MR counter value n+1. At this point, assume the integrity of the old data is verified.

11. The tamper-proof module 102 calculates new keys MIK_n+2 and MCK_n+2 by using the current counter value n+2. Again, it should be noted that the MR 112 is not incremented at this point.

12. The tamper-proof module 102 uses the new keys MIK_n+2 and MCK_n+2 to encrypt/integrity protect the DRM_counter(value x−1). In addition, the tamper-proof module 102 encrypts/integrity protects the verified old data (see step 10) using MIK_n+2 and MCK_n+2.

13. The tamper-proof module 102 stores the old data which was protected by keys MIK_n+2 and MCK_n+2 in the rewritable openly accessible memory 108. In addition, the protected DRM_counter(value x−1) is stored as DRM_counter n+2 which replaces the former DRM_counter_n+1 in the rewritable openly accessible memory 108.

14. The tamper-proof module 102 increments MR 112 from n+1 to n+2. Once, MR 112 has been incremented then there is no way to retrieve and use keys with smaller values than the current n+2.

15. The tamper-proof module 102 erases the old version of the data that was verified in step 10 by using keys MIK_n+1 and MCK_n+1.

16. Attacker inserts the encrypted/integrity protected DRM_counter_n+1 into the rewritable openly accessible memory 108. And, deletes the encrypted/integrity protected DRM_counter_n+2.

17. Upon some trigger event (e.g., start-up, controlled power down, update of critical security parameters), the old data currently stored in the rewritable openly accessible memory 108 is verified to make sure it was not the subject of a replay attack. To verify the old data, the tamper-proof module 102 (using the processor 104 and read-only-memory (ROM) code) checks the MAC value (or values) of the protected old data using keys MIK_n+2 and MCK_n+2 which are based on the current MR counter value n+2. At this point, the integrity check fails because the fraudulent encrypted/integrity protected DRM_counter_n+1 does not have the correct MAC. And, if the integrity check fails for the whole or part of the memory 108, then the corresponding old data (which in this case is DRM_counter_n+1) is erased or marked as invalid.

An important part of the present solution is the realization of the MR 112. Following is a list of several different options that can be used to realize the MR 112:

- The counter n can be stored in a physical protected flash memory, Erasable Programmable Read Only Memory (EPROM) or Electronically Erasable Programmable Read Only Memory (EEPROM) on the tamper-proof module 102. In the event, the device 100 is a mobile phone then the tamper-proof module 102 can be located on a baseband chip and the physical protected flash memory, EPROM or EEPROM in which the counter n is stored can also be located on the baseband chip.
- The counter n can be updated by writing a value into an electronic fuse/one-time write memory.
- The counter n can be stored in and retrieved from an external secure source and then sent protected (encrypted and integrity protected) to the tamper-proof module 102.

Figure 2:
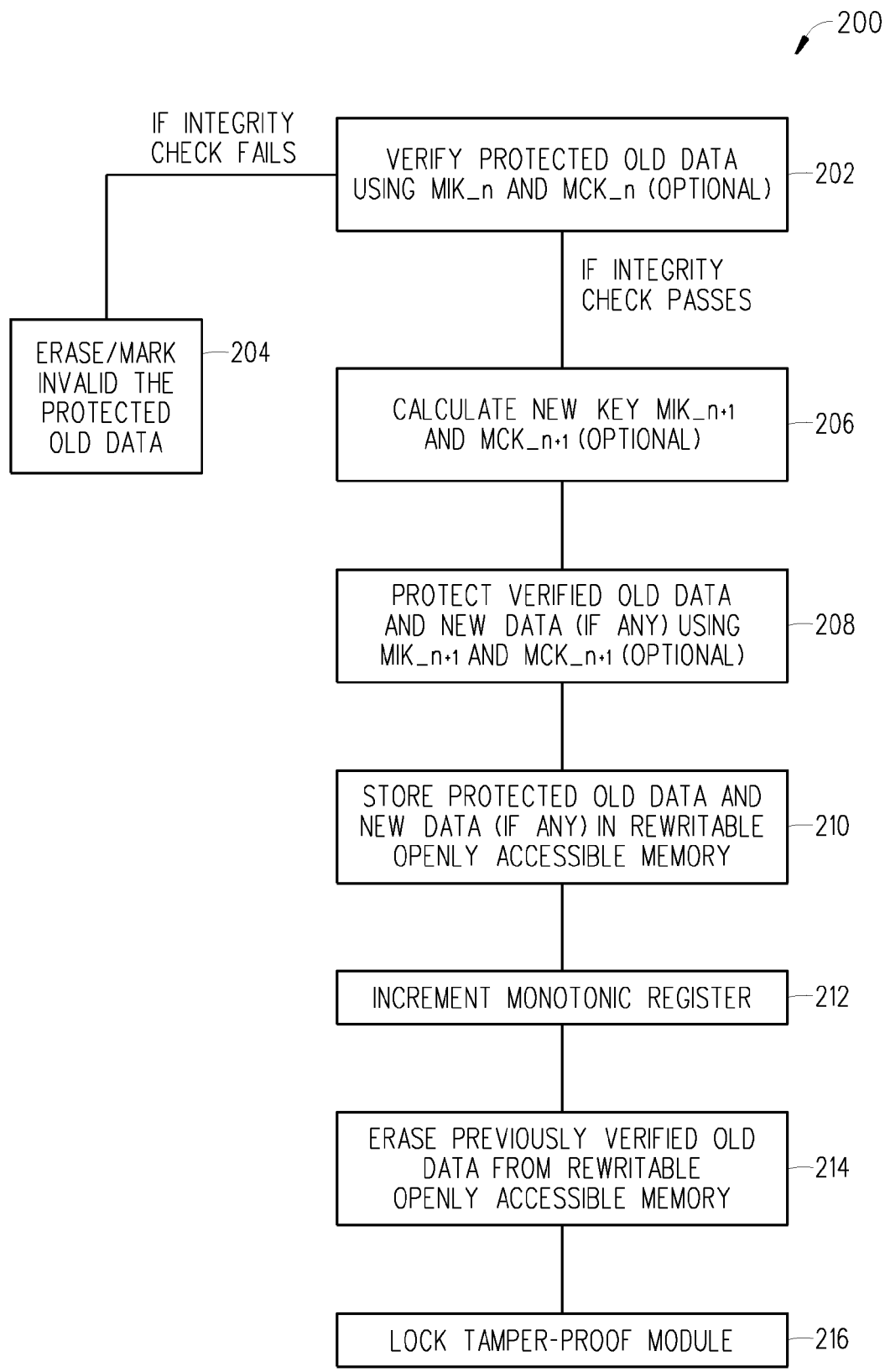
FIG. 2 is a flow diagram of the basic steps of a method for protecting data stored in a rewritable openly accessible memory in accordance with the present invention.

Referring to FIG. 2, there is a flowchart provided to illustrate the basic steps of a method 200 for protecting data stored in rewritable openly accessible memory 108 in accordance with the present invention. Upon a triggering event, the tamper-proof module 102 verifies the integrity of old data which is stored in the rewritable openly accessible memory 108 by using the current MIK_n and if desired the current MCK_n (see step 202). If the integrity check fails, then the tamper-proof module 102 either erases the old data or marks the old data as invalid because one cannot trust the old data currently stored in the rewritable openly accessible memory 108 (see step 204).

In the event, the integrity check passes then the tamper-proof module 102 calculates a new key MIK_n+1 and if desired MCK_n+1 (step 206). Each new key MIK_n+1 and if desired MCK_n+1 is calculated by using a PRF, a secret key (PK) and a counter value plus one (n+1). The tamper-proof module 102 then protects the verified old data and the new data if there is any using the new key MIK_n+1 and if desired MCK_n+1 (step 208). Thereafter, the tamper-proof module 102 stores the protected old data and the protected new data if there is any in the rewritable openly accessible memory 108 (step 210).

The tamper-proof module 102 then increments/steps the MR 112 so it has a counter value (n+1) (step 212). The definitive counter update should not happen until the memory data has been verified, because the idea is that the old keys MIK_n/MCK_n cannot be made obsolete until all the protected memory data has been correctly protected under the new keys MIK_n+1/MCK_n+1. Then, the tamper-proof module 102 erases the previously verified old data (see step 202) from the rewritable openly accessible memory 108 (step 214).

At this point, the tamper-proof module 102 can be locked using a particular hardware signal to prevent any further read out of integrity keys and to prevent any new calculations of MACs until the next boot occasion or the next MR update occasion (step 216). However, new data can still be added whenever it is desired but one needs to use the current key(s) to add the new data. Of course, one needs to define which events are needed to unlock the current key. Otherwise, one could trigger an MR update which performs the check of validity for old data, adds new data, increments the MR and protects all data as described above.

Figure 3:
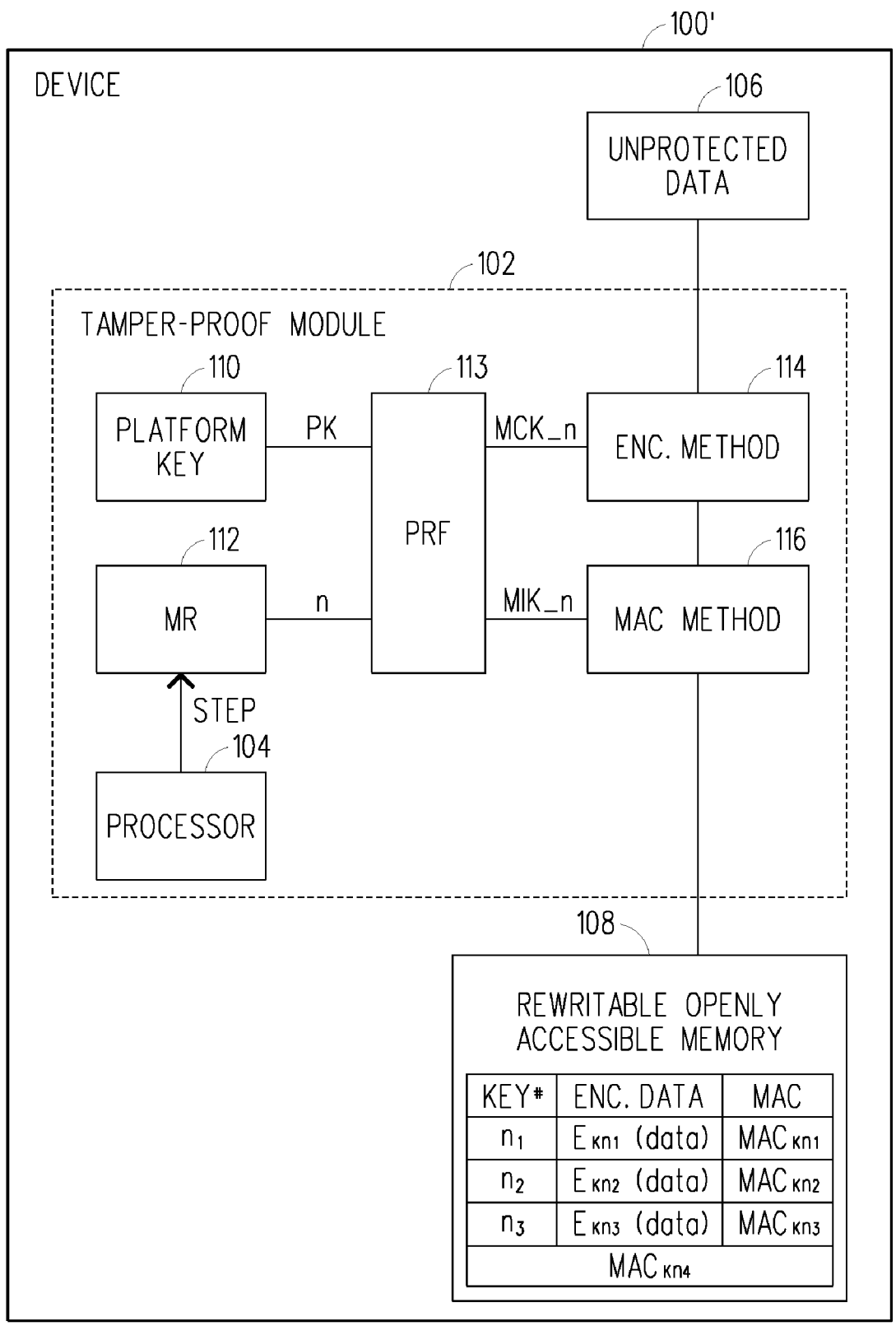
FIG. 3 is a block diagram of a device (e.g., mobile device) which has a tamper-proof module that confidentiality and integrity protects data stored in a rewritable openly accessible memory in accordance with another embodiment of the present invention.

Referring to FIG. 3, there is a block diagram of a device 100' (e.g., mobile device 100') which has a tamper-proof module 102 that confidentiality and integrity protects data which is to be stored in a rewritable openly accessible memory 108 in accordance with another embodiment of the present invention. This device 100' has the same components including the processor 104, the platform key holder 110, the MR 112, the PRF 113, the encryption method 114, and the MAC method 116 as used in the device 100 shown in FIG. 1. But, this device 100' is designed to make the administration simpler by protecting a particular part of the data as described above and then storing that particular part of protected data along with the used MR key number in the rewritable openly accessible memory 108.

In this embodiment, the tamper-proof module 102 integrity protects all such memory parts by calculating a MAC for each individual part of protected data and then it integrity protects all of the protected data by calculating a MAC (shown as $MAC_{Kn4}$) over the MACs that are stored with all of the protected individual parts of data. In this way, the tamper-proof module 102 does not need to recalculate all of the MACs and then re-encrypt all of data when an MR update takes place. And, the non-changing data is kept with its old protection. To enable verification, the tamper-proof module 102 needs to know the key number MR used when it originally protected that data part in order to derive the relevant keys. And, the tamper-proof module 102 also needs to verify that no data part has been exchanged with some other protected data part by an attacker. To achieve this, the tamper-proof module 102 can calculate and verify the MAC (shown as $MAC_{Kn4}$) used to integrity protect all of the individual data parts. In this extended version, a policy should be implemented to guide which keys can be generated, e.g. only keys in a given window below the current counter value could be allowed.

Following are some additional features and advantages of the present solution:

1. The tamper-proof module should be a part of a chip that contains memory and processing capabilities which are difficult to probe. It should be difficult to probe so it is hard to retrieve information either statically or during processing.

2. The protected data could contain a record with a counter that indicates for how many updates the data is to be considered valid. If this is the case, one reduces this counter value during each update and if the value equals zero, then the corresponding data is erased or marked as invalid. This can be used when the protected data should be valid for only a certain number of MR updates.

3. The present solution can be used to aid in a firmware mobile device software upgrade. For instance, mobile device upgrade software can be downloaded over the air to the mobile device. If, the user of the mobile device does not want the upgrade to take place while he/she is using the mobile device because the upgrade requires a complete reboot and rebuild of the mobile device's software. Then, the user can postpone the upgrade to take place during off-hours such as night time. If this happens, then in order to restart the mobile device it normally requires some secret signaling input like a PIN (Personal Identification Number). The update trigging signaling value must then be given to the mobile device in advance in order for the mobile device to enter the update mode at the next boot event. Hence, the trigger signaling needs to be stored and protected in the mobile device's non-volatile memory. The protected stored signaling should in this case only be valid one time, i.e. at the next start-up of the mobile device 4. It should be appreciated that the processor 104 described herein can perform various actions in accordance with the present solution by using specialized circuits or circuitry (e.g., discrete logic gates interconnected to perform a specialized function), program instructions, or a combination of both.

Although two embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the scope of the invention as set forth and defined by the following claims.

The invention claimed is:

1. A method for protecting data stored in a rewritable openly accessible memory, said method comprising the steps of:
    generating one or more keys (MIK_n and if desired MCK_n);
    protecting the data using said one or more keys (MIK_n and possibly MCK_n), wherein said protecting step includes confidentiality protecting the data by applying an encryption method to the data using the MCK_n
    storing the protected data in the rewritable openly accessible memory; and
    said generating step further includes:
        generating each key (MIK_n and if desired MCK_n) in a tamper-proof module by using a pseudo random function (PRE), a secret key (PK) and a monotonic register counter value (n); and
        generating each key (MIK_n and if desired MCK_n) in the tamper-proof module such that it is possible to generate the one or more keys (MIK_n and if desired MCK_n) and one or more new keys (MIK_n+1 and if desired MCK_n+1).

2. A method for protecting data stored in a rewritable openly accessible memory, said method comprising the steps of:
    verifying integrity of old data stored in the rewritable openly accessible memory by using one or more current keys (MIK_n and if desired MCK_n);
    calculating one or more new keys (MIK_n+1 and if desired MCK_n+1), wherein each new key (MIK_n+1 and if desired MCK_n+1) is calculated by using a pseudo random function (PRF), a secret key (PK) and a counter value plus one (n+1);
    protecting the verified old data and new data if any using the one or more new keys (MIK_n+1 and if desired MCK_n+1);
    storing the protected old data and the protected new data if any in the rewritable openly accessible memory;
    incrementing a monotone register to have a counter value (n+1); and
    erasing the verified old data from the rewritable openly accessible memory.

3. The method of claim 2, wherein if the integrity of the old data cannot be verified then:
    erasing the old data because one cannot trust the old data stored in the rewritable openly accessible memory, or
    marking the old data as invalid because one cannot trust the old data stored in the rewritable openly accessible memory.

4. The method of claim 2, wherein said one or more new keys includes:
    an integrity key (MIK_n) which is generated by using the pseudo random function (PRF), the secret key (PK) and the counter value plus one (n+1); and
    an encryption key (MCK_n) which if desired is generated by using the same PRF or a different PRF, the secret key (PK) and the counter value plus one (n+1).

5. The method of claim 2, wherein said protecting step includes:
    integrity protecting the old data and the new data if any by applying a message authentication code (MAC) method to the data using the MIK_n+1.

6. The method of claim 5, wherein the protected data is encrypted data.

7. The method of claim 2, wherein said protecting step includes:
    confidentiality protecting the old data and the new data if any by applying an encryption method to the data using the MCK_n.

8. The method of claim 2, wherein said data that is protected includes a DRM counter and/or a SIM card prepaid amount.

9. A device comprising:
    a tamper-proof module;
    a rewritable openly accessible memory; and
    said tamper-proof module includes a processor and protected software that performs the following actions:
    verify integrity of old data stored in the rewritable openly accessible memory by using one or more current keys (MIK_n and if desired MCK_n);
    calculate one or more new keys (MIK_n+1 and if desired MCK_n+1), wherein each new key (MIK_n+1 and if desired MCK_n+1) is calculated by using a pseudo random function (PRE), a secret key (PK) and a counter value plus one (n+1);
    protect the verified old data and new data if any using the one or more new keys (MIK_n+1 and if desired MCK_n+1);
    store the protected old data and the protected new data if any in the rewritable openly accessible memory;
    increment a monotone register to have a counter value (n+1); and
    erase the verified old data from the rewritable openly accessible memory.

10. The device of claim 9, wherein if the tamper-proof module can not verify the integrity of the old data then:
    erase the old data because one cannot trust the old data stored in the rewritable openly accessible memory; or
    mark the old data as invalid because one cannot trust the old data stored in the rewritable openly accessible memory.

11. The device of claim 9, wherein said one or more new keys includes:
    an integrity key (MIK_n+1) which is generated by using the pseudo random function (PRF), the secret key (PK) and the counter value plus one (n+1); and
    an encryption key (MCK_n+1) which if desired is generated by using the same PRF or a different PRF, the secret key (PK) and the counter value plus one (n+1).

12. The device of claim 9, wherein said protecting step includes:
  integrity protecting the old data and the new data if any by applying a message authentication code (MAC) method to the data using the MIK_n+1.

13. The device of claim 12, wherein the protected data is encrypted data.

14. The device of claim 9, wherein said protecting step includes:
  confidentiality protecting the old data and the new data if any by applying an encryption method to the data using the MCK_n.

15. The device of claim 9, wherein said tamper-proof module stores the monotone register in a physical protected memory, an EPROM, an EEPROM or an electronic fuse.

16. A device comprising:
  a tamper-proof module;
  a rewritable openly accessible memory; and
  said tamper-proof module includes a processor and protected software that performs the following actions:
    generate key(s) using a pseudo random function (PRF), a secret key (PK) and a monotonic register counter value (n);
    protect an individual part of data using the generated key(s); and
    store the protected individual part of data and the monotonic register counter value (n) in said rewritable openly accessible memory, wherein said processor and said protected software functions to protect other individual parts of data using other generated key(s) and also stores the protected other individual parts of data along with corresponding other monotonic register counter values in said rewritable openly accessible memory.

17. A device comprising:
  a tamper-proof module;
  a rewritable openly accessible memory; and
  said tamper-proof module includes a processor and protected software that performs the following actions:
    generate key(s) using a pseudo random function (PRE), a secret key (PK) and a monotonic register counter value (n);
    protect an individual part of data using the generated key(s); and
    store the protected individual part of data and the monotonic register counter value (n) in said rewritable openly accessible memory, wherein said processor and said protected software functions to protect an integrity of each one of the individual parts of data by calculating a MAC and then protects an integrity of all of the individual parts by calculating a MAC over all of the stored monotonic register counter values associated with all of the individual parts of data.

* * * * *

UNITED STATES PATENT AND TRADEMARK OFFICE
CERTIFICATE OF CORRECTION

PATENT NO. : 7,681,050 B2  Page 1 of 1
APPLICATION NO. : 11/275015
DATED : March 16, 2010
INVENTOR(S) : Blom et al.

It is certified that error appears in the above-identified patent and that said Letters Patent is hereby corrected as shown below:

In Column 3, Line 47, delete "t hat" and insert -- that --, therefor.

In Column 7, Line 35, in Claim 1, delete "MCK_n" and insert -- MCK_n; --, therefor.

In Column 7, Line 41, in Claim 1, delete "(PRE)," and insert -- (PRF), --, therefor.

In Column 8, Line 43, in Claim 9, delete "(PRE)," and insert -- (PRF), --, therefor.

In Column 10, Line 13, in Claim 17, delete "(PRE)," and insert -- (PRF), --, therefor.

Signed and Sealed this

Ninth Day of November, 2010

David J. Kappos
*Director of the United States Patent and Trademark Office*